(12) United States Patent
Young et al.

(10) Patent No.: US 7,166,221 B1
(45) Date of Patent: Jan. 23, 2007

(54) OIL DIGESTING MICROBE-PLASTIC FOAM SYSTEM

(75) Inventors: William Ian Young, No. Scituate, MA (US); John Kingsky Foster, Harwichport, MA (US)

(73) Assignee: William I. Young, North Scituate, MA (US)

( * ) Notice: Subject to any disclaimer, the term of this patent is extended or adjusted under 35 U.S.C. 154(b) by 112 days.

(21) Appl. No.: 10/602,281

(22) Filed: Jun. 24, 2003

Related U.S. Application Data

(60) Provisional application No. 60/390,933, filed on Jun. 24, 2002.

(51) Int. Cl.
*E02B 15/04* (2006.01)

(52) U.S. Cl. ............... 210/608; 210/615; 210/693; 210/747; 210/150; 210/170; 210/209; 210/242.4; 210/922; 210/924; 435/262; 435/281

(58) Field of Classification Search .......... 210/608, 210/615, 747, 691, 693, 150, 151, 170, 209, 210/922, 924, 616, 242.4; 435/262, 281, 435/262.5
See application file for complete search history.

(56) References Cited

U.S. PATENT DOCUMENTS

| | | | | |
|---|---|---|---|---|
| 4,427,548 A * | 1/1984 | Quick, Jr. | ................ | 210/150 |
| 4,670,149 A * | 6/1987 | Francis | ................ | 210/608 |
| 4,810,385 A * | 3/1989 | Hater et al. | ................ | 210/150 |
| 5,348,803 A * | 9/1994 | Schlaemus et al. | ......... | 210/922 |
| 5,725,885 A * | 3/1998 | Felix et al. | ................ | 210/922 |
| 5,807,724 A * | 9/1998 | Resnick | ................ | 435/281 |
| 5,888,396 A | 3/1999 | Perriello | | |
| 5,925,252 A * | 7/1999 | Cline | ................ | 210/170 |
| 5,962,309 A * | 10/1999 | Kumagai et al. | ........... | 210/615 |
| 6,153,094 A * | 11/2000 | Jowett et al. | ............... | 210/615 |
| 6,573,087 B2 | 6/2003 | Lehr | | |
| 6,730,509 B2 * | 5/2004 | VanErdewyk | ............... | 435/262 |
| 6,936,446 B2 * | 8/2005 | Kallenbach et al. | ........ | 210/616 |

FOREIGN PATENT DOCUMENTS

WO    WO 2005/042406 A2    5/2005

* cited by examiner

*Primary Examiner*—Christopher Upton
(74) *Attorney, Agent, or Firm*—Birch, Stewart, Kolasch & Birch, LLP

(57) ABSTRACT

This invention is a system and method for bioremediation of hydrocarbon and organic pollution in fresh and salt water. Hydrocarbon and organic pollution digesting microbes are placed in a floating carrier where the microorganisms are exposed to the pollution and the pollution is digested. The floating element may be a block of polymeric foam. The microbes may be supported on powder such as clay minerals, and the powder may be formed into pellets held in slits in the foam.

25 Claims, 2 Drawing Sheets

OIL DIGESTING MICROBE-PLASTIC FOAM SYSTEM

CROSS-REFERENCE TO RELATED APPLICATIONS

This application claims the benefit under 35 U.S.C. §119 (e) of U.S. Provisional Application No. 60/390,933 filed Jun. 24, 2002, all of which is hereby incorporated by reference.

STATEMENT REGARDING FEDERALLY SPONSORED RESEARCH OR DEVELOPMENT

This invention has been created without the sponsorship or funding of any federally sponsored research or development program.

FIELD OF THE INVENTION

This invention related generally to bioremediation of hydrocarbon and organic pollution in fresh and salt water, especially in vessel bilges.

BACKGROUND OF THE INVENTION

Numerous systems and methods have been developed to achieve bioremediation of hydrocarbon and organic pollution in fresh and salt water, especially in vessel bilges.

All of the above systems have drawbacks and limitations. In some cases, the limitations relate to the degree of bioremediation that can be accomplished with a specific system or piece of equipment. In other cases, the limitations relate to the kinds of pollution that can be effectively bioremediated within a specific system or piece of equipment.

These and other difficulties experienced with the prior art systems have been obviated in a novel manner by the present invention.

It is, therefore, an outstanding object of the present invention to provide apparatus and methods that increase the ability and effectiveness of a piece of equipment or system to bioremediate a polluted situation.

Another object of this invention is to provide apparatus and methods that reduce the equipment space required to effectively bioremediate a polluted situation.

A further object of the present invention is to provide apparatus and methods that increase the range of kinds and physical properties of liquid streams that a piece of equipment or system can effectively bioremediate a polluted situation.

It is another object of the invention is to provide apparatus and methods that can retrofit existing equipment or systems to increase the ability and effectiveness of the equipment or system to bioremediate a polluted situation.

It is a further object of the invention to provide a bioremediation system which is capable of being manufactured of high quality and at a low cost, and which is capable of providing a long and useful life with a minimum of maintenance.

With these and other objects in view, as will be apparent to those skilled in the art, the invention resides in the combination of parts set forth in the specification and covered by the claims appended hereto, it being understood that changes in the precise embodiment of the invention herein disclosed may be made within the scope of what is claimed without departing from the spirit of the invention.

SUMMARY OF INVENTION

This invention is a system and method for bioremediation of hydrocarbon and organic pollution in fresh and salt water. Hydrocarbon and organic pollution digesting microbes are placed in a floating carrier where the microorganisms are exposed to the pollution and the pollution is digested. The floating element may be a block of polymeric foam. The microbes may be supported on powder such as clay minerals, and the powder may be formed into pellets held in slits in the foam.

BRIEF DESCRIPTION OF THE DRAWINGS

The character of the invention, however, may best be understood by reference to one of its structural forms, as illustrated by the accompanying drawings, in which.

DETAILED DESCRIPTION OF THE INVENTION

Foam encapsulated tablet turns petroleum hydrocarbon base materials into water soluble fatty acids utilizing a one gram tablet of nonhazardous, nonpathogenic microbes housed in bentonite clay that is placed in a precut slit of 1½" open cell cross linked polyethylene approximately 4"×6" wide, affords the following results in the bilge area of commercial and consumer powerboats. Instead of a slit, the tablet or pellet may be held in any opening or bore that is shaped to hold the tablet securely in the foam.

The "opcell" foam gives the microbe tablet a protective lining against water in the bilge. There are approximately 5 billion microbes per gram of tablet. The foam also keeps the microbes floating on the surface of the bilge water. Otherwise, the microbes tend to sink to the bottom of the bilge, and away from the oil. The oil tends to float on the upper surface of the bilge water. Separation of the oil and microbes tends to reduce the effectiveness of the microbes, whereas the fact that the foam keeps the microbes and oil in contact, increases the effectiveness of the microbes in digesting the oil. When petroleum hydrocarbons become present in the bilge area, the opcell foam (made from a 100% oil based resin) has a molecular attraction to the oil or gas and draws it in to the center of the foam which then activates the microbes. The preferred foam is a cross-linked, open cell polyethylene foam which is capable of absorbing more than 32 times its weight in oil. The microbes double in number every 20 minutes under ideal condition to approximately 10 billion and immediately start attacking the hydrocarbons, turning then into water soluble fatty acids, which now is suitable fish food and may safely be pumped out of the boat in any body of water.

Once the microbes have finished digesting the targeted hydrocarbons, they will either die, return to former natural concentration levels, or be eaten by other organisms.

Figure 1:
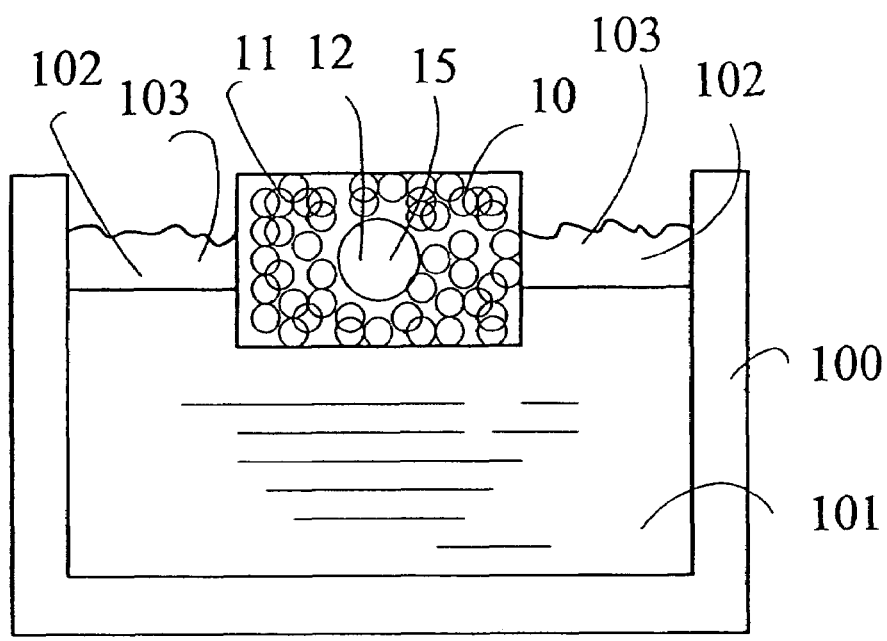
FIG. 1 is a schematic elevation view of a bioremediation system embodying the principles of the present invention.

Referring to FIG. 1, a typical application of the present invention concerns a tank 100 which is filled with sea water 101 and a hydrocarbon pollutant 102 such as motor oil or fuel oil. The pollutant 102 typically forms a layer 103 on the surface of the water 101, because the hydrocarbon pollutant 102 typically has a lower density that water, even sea water. The oil digestion system 10 of the present invention includes a polymeric porous floater 11, and microbes 12 carried by and typically within the floater 11. The floater keeps the microbes 12 at the upper surface of the water 101 and in the oil layer 103. The floater 11 can be in the form of a floating boom normally used to segregate polluted water from non-polluted water. The pollutant penetrates and typically is drawn into the floater 11, where it is exposed to the microbes 12. The microbes are activated and digest the pollutant into non polluting products.

Figure 2:
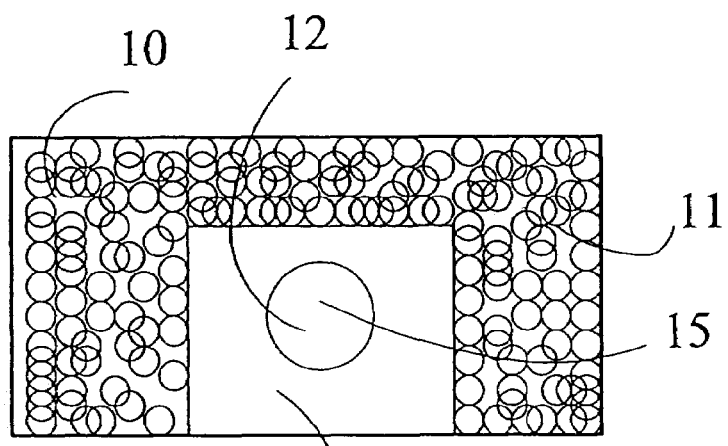
FIG. 2 is a schematic elevation view of a bioremediation system embodying the principles of the present invention.

FIG. 2 shows the system 10 with the microbes 12 in a pellet 15 which is lodged in a slit 16 in the floater 11.

Figure 3:
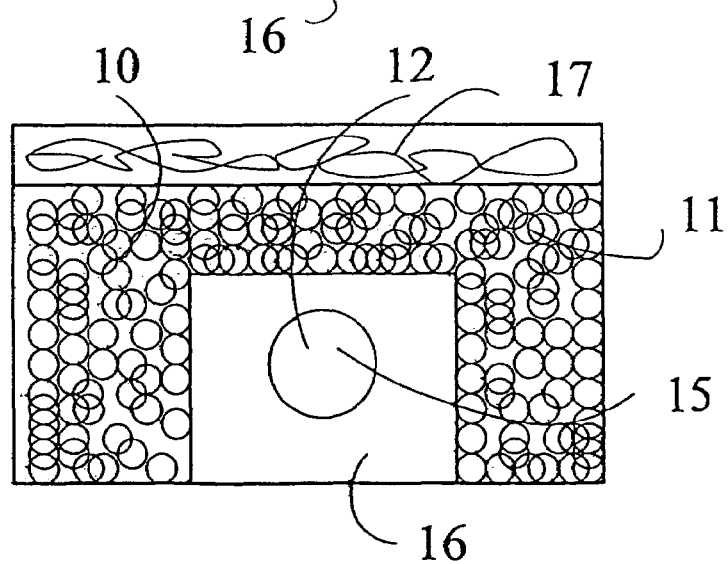
FIG. 3 is a schematic view of another embodiment of the present invention.

FIG. 3 shows the system 10, with a fabric scrubbing layer 17 attached to the upper surface of the floater so that the floater can be used to scrub accumulations from the walls of the tank 100 or from other places.

Figure 4:
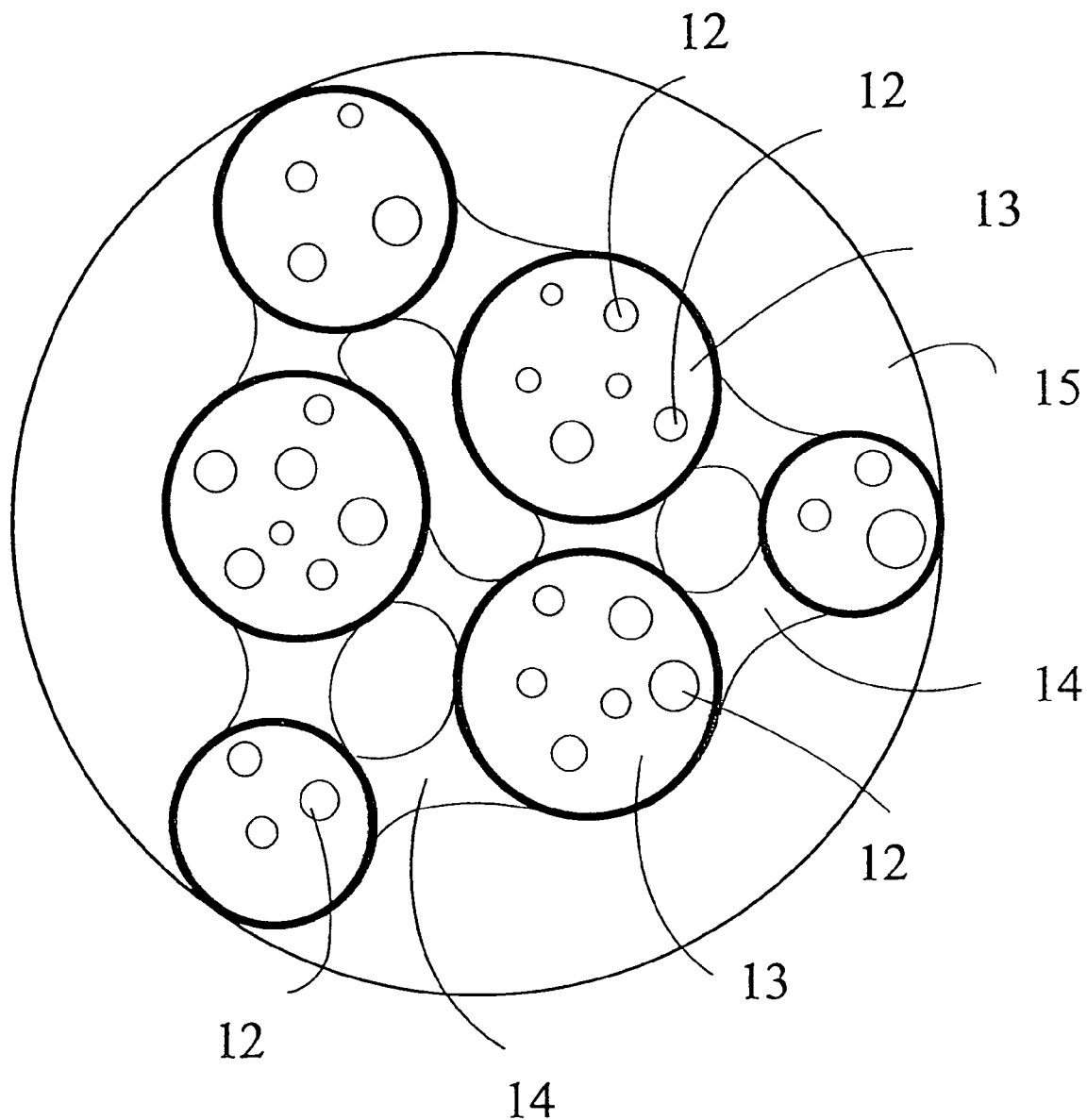
FIG. 4 is a schematic microscopic view of an embodiment of the present invention.

In a typical situation, as shown schematically in FIG. 4, the microbes 12 are fixed to the surface of a fine powder substrate 13. The powder is preferably a clay mineral and preferably bentonite clay. The powder is then combined with a binder 14 and formed, as by pressing in a die, into porous pellets 15 of about ¼ to 1 inch diameter. The substrate may also function as the binder, as does bentonite clay. The pellets 15 are then placed in slits 16 in the floater 11, where the sponge action of floater 11 holds the pellets 15.

The microbe are any hydrocarbon digesting organisms. Preferably, they are a natural ubiquitous hydrocarbon-oxidizing microorganism for use in removing hydrocarbons and organic materials from soils and fresh and salt water by natural oxidative pathways.

Preferably, the microbe is of the type sold by Microsorb Environmental Products, Inc. under the trademark MICROSORB®.

The purpose of this invention is to facilitate bioremediation, which refers to any method that uses microbes to recycle undesirable organic materials into acceptable products. Bioremediation takes place when the microbes are exposed to hydrocarbons and converts them into products such as carbon dioxide, water, and oxygen. Once activated, the microbes convert the hydrocarbons and odors-causing compounds, such as fish or sewage, into environmentally acceptable products such as carbon dioxide, water, oxygen, water-soluble fatty acids, and trace carbon.

This invention involves 1) the transformation of microbes from a powder into a compressed tablet or the formation of millions of oil-eating microbes into a tablet form. 2) The combination or combining of microbes either as a tablet, powder, or liquid with various other carriers to achieve bioremediation. 3) This invention is geared to improving the environment which is a great concern to all mankind.

It takes pollutants and turns them into environment-friendly byproducts, a benefit to mankind at no expense. This invention may be used in the bilge area of both commercial and recreational boats, in marinas, in holding tanks, in cooling tanks, in papermaking plants, in polluted areas corded off by floating booms, in kitchen grease traps, in water run-off catch basins, in sewer systems, in wetlands, in streams, in lakes and waters of the world—anywhere hydrocarbons are present and undesired. The carriers can take various forms, for example: a) an open-cell cross-linked polyethylene foam such as opcell or opflex, (one such preferred product is manufactured by Cellect Foam L.L.C.) which are hydroscopic and absorb up to 32 times their weight in oil and are oil derivatives, b) a closed-cell polyethelene, polypropelene, a moulded or expanded polystyrene, c) an open-cell polyurethane foam (reference: U.S. Pat. No. 5,264,134, McCaney who references open-cell sponge), d) any other appropriate carrier, or e) a boom material. The carrier can also be combined with other substrates such as fibers, polyesters, nylon, PVC, etc., for the purpose of absorbing, polishing, cleaning, deodorizing, scrubbing, protecting, filtering, buffing etc. The carrier with microbes may also be encased in an outer permeable container such as mesh or geotextile filter for various reasons, including ease of use and further protection for the carrier and possibly a substrate that attracts the hydrocarbons. Such substrates will be of a material that acts as a filter. The carrier with microbes may also be encapsulated into what is known in the industry as oil containment booms. The tablet or microbes to be in a container such as a poly bag which would be activated with a substance i.e. water, hydrocarbons, and that can itself be the floating material or floater or it can be attached to or encased in the floating material of floater.

In addition to placing microbes into the foam after the foam is foamed, one embodiment of the invention includes the process of mixing the microbes uniformly into the pre-foamed polymer. Then the polymer is foamed. In this way, the microbe is distributed more uniformly throughout the resulting floater.

Another embodiment of the invention would have a layer of foam glued to another layer of foam or a layer of fabric (as shown in FIG. 3), but with the tablet or pellet held between the layers. This would hold the tablet more securely in the floater.

Frequently Asked Questions about MicroSorb(R), a hydrocarbon-digesting microbe system sold by Microsorb Environmental Products, Inc. of Norwell Mass.

Q: What is bioremediation?

A: This term refers to any method that uses microbes to recycle organic materials.

Q: What is MicroSorb(R)?

A: MicroSorb(R) is a special formula designed to optimize the recycling phenomena with the addition of oil-eating microbes. It contains naturally occurring microbes that convert the contaminant into non-toxic components, thereby eliminating the problem of disposal. These microbes are housed in an inert fine powder carrier which absorbs and locks in the contaminant during remediation. The naturally cultured microbes then consume and convert the contaminant.

Q: What exactly are "oil-eating microbes"?

A: They are microbes that have been collected from natural water and soil sources from around the world. They are selected for their particular affinity for consuming hydrocarbon-based products.

Q: Do the microbes need extra special treatment?

A: They only need what most forms of life need: oxygen, water, food (hydrocarbons) and an acceptable temperature (28 degrees F. to 140 degrees F.) and pH (5.50 to 10.00).

Q: What happens to the microbes after the oil or fuel has been consumed?

A: The microbes will either die, return to former natural concentration levels, or be eaten by other organisms.

Q: What are the final by-products?

A: Carbon dioxide, water, trace carbon, water-soluble fatty acids, and bacterial cells.

Q: How rapidly does it work?

A: The microbes begin working immediately, once activated by salt water or fresh water. Remediation times vary from several hours to several weeks depending on the type and concentration of the hydrocarbon. For example, light fuels floating on water will be gone within a few hours. Heavy crude oil in soil will require several months.

Q: Can this product be used wet or dry?

A: Yes, the product can be used in either a wet (slurry) or dry (powder) form.

Q: Is it safe?

A: Yes, MicroSorb(R) is 100% environmentally safe, non-toxic, and contains no pathogens.

Q: Does the product have any other benefits?

A: Yes. MicroSorb(R)'s ability to absorb and lock up spills almost immediately prevents further spread of the contaminant, and immediately lowers the flash point (volatility).

Q: Why does the product smell like oil?

A: The microbes in MicroSorb(R) are fed crude oil to ensure they will eat hydrocarbons when used or spills.

Q: Will these microbes begin consuming materials other than those which are intended?

A: No, they will not mutate and start converting any material other than the specific contaminant to which they have been applied.

Q: Are microbes dangerous to my health?

A: No, microbes are found everywhere in the environment, and are the original recyclers of organic materials. The average human adult carries approximately 3 lbs. of microbes on and in the body.

Q: Are humans or wildlife adversely affected by the use of this product?

A: No, the by-products produced by these microbes are used as an energy source by higher organisms. Intensive lab tests have shown no toxic side effects.

Q: What happens if I ingest or inhale the products?

A: It will taste like mud, could make you sneeze, but it is non-toxic and harmless.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desire to secure by Letters Patent is:

The invention claimed is:

1. A hydrocarbon bioremediation system for removing hydrocarbons from a body of water, comprising:
   (a) a floater formed of a porous polymeric foam and adapted to float in or on the surface of the body of water, and
   (b) microbes within at least the core of the floater, adapted to digest the hydrocarbons.

2. A system as recited in claim 1, wherein the microbes are in the form of a pellet.

3. A hydrocarbon bioremediation system for removing hydrocarbons from a body of water, comprising:
   (a) a floater formed of a porous polymeric foam and adapted to float in or on the surface of the body of water, and
   (b) microbes within the floater, adapted to digest the hydrocarbons, wherein the microbes are in the form of a pellet, and wherein the floater has an opening, and the pellet is located in an opening in the floater.

4. A system as recited in claim 3, wherein the microbes are attached to powder which is pressed into a pellet.

5. A system as recited in claim 4, wherein the powder is a clay material.

6. A system as recited in claim 4, wherein the powder is a bentonite clay.

7. A system as recited in claim 3, wherein the microbe is a natural ubiquitous hydrocarbon-oxidizing microorganism for use in removing hydrocarbons and organic materials from soils and fresh and salt water by natural oxidative pathways.

8. A system as recited in claim 3, wherein the foam is open celled and adapted to absorb hydrocarbons.

9. A system as recited in claim 3, wherein the microbes are in the form of a liquid.

10. A method for removing hydrocarbons from a body of water, comprising:
    (a) placing microbes, adapted to digest hydrocarbons, into at least the core of a floater formed of a porous polymeric foam and adapted to float in or on the surface of the body of water,
    (b) placing the floater containing the microbes into a body of water containing hydrocarbons,
    (c) allowing the hydrocarbons to penetrate the floater and to contact the microbes, and
    (d) allowing the microbes within the floater to digest the hydrocarbons.

11. A method as recited in claim 10, wherein the microbes are in the form of a pellet.

12. A method for removing hydrocarbons from a body of water, comprising:
    (a) placing microbes, adapted to digest hydrocarbons, into a floater formed of a porous polymeric foam and adapted to float in or on the surface of the body of water,
    (b) placing the floater containing the microbes into a body of water containing hydrocarbons,
    (c) allowing the hydrocarbons to penetrate the floater and to contact the microbes, and
    (d) allowing the microbes within the floater to digest the hydrocarbons, wherein the microbes are in the form of a pellet, and wherein the floater has a slit, and the pellet is located in a slit on the floater.

13. A method as recited in claim 12, wherein the microbes are attached to powder which is pressed into a pellet.

14. A method as recited in claim 13, wherein the powder is a clay material.

15. A method as recited in claim 13, wherein the powder is a bentonite clay.

16. A method as recited in claim 12, wherein the microbe is a natural ubiquitous hydrocarbon-oxidizing microorganism for use in removing hydrocarbons and organic materials from soils and fresh and salt water by natural oxidative pathways.

17. A method as recited in claim 12, wherein the foam is open celled and adapted to absorb hydrocarbons.

18. A method for removing hydrocarbons from a body of water, comprising:

(a) placing microbes, adapted to digest hydrocarbons, into a floater formed of a porous polymeric foam and adapted to float in or on the surface of the body of water, (b) placing the floater containing the microbes into a body of water containing hydrocarbons, (c) allowing the hydrocarbons to penetrate the floater and to contact the microbes, and (d) allowing the microbes within the floater to digest the hydrocarbons, wherein the microbes are mixed into the polymeric foam prior to being foamed.

19. A hydrocarbon bioremediation system for removing hydrocarbons from a body of water, comprising:

(a) a floater formed of a porous polymeric foam and adapted to float in or on the surface of the body of water, and (b) microbes within the floater, adapted to digest the hydrocarbons, wherein the microbes are mixed into the polymeric foam prior to being foamed.

20. A hydrocarbon bioremediation system for removing hydrocarbons from a body of water, comprising:

(a) a floater formed of a porous polymeric foam and adapted to float in or on the surface of the body of water, and (b) microbes within the floater, adapted to digest the hydrocarbons, wherein the floater has an opening, and the microbes are located in an opening in the floater.

21. A hydrocarbon bioremediation system for removing hydrocarbons from a body of water, comprising:

(a) a floater formed of a porous polymeric foam and adapted to float in or on the surface of the body of water, and (b) microbes located at least within the core of the floater, adapted to digest the hydrocarbons.

22. A hydrocarbon bioremediation system for removing hydrocarbons from a body of water, comprising:

(a) a floater formed of a porous polymeric foam and adapted to float in or on the surface of the body of water, and (b) microbes located at least within the floater, adapted to digest the hydrocarbons, wherein the microbes are located throughout the floater.

23. The system as recited in claim 22, wherein the microbes are in the form of a tablet, powder or liquid.

24. A hydrocarbon bioremediation system for removing hydrocarbons from a body of water, comprising:

(a) a floater formed of a porous polymeric foam and adapted to float in or on the surface of the body of water, and (b) microbes located at least within the floater, adapted to digest the hydrocarbons, wherein the floater has an opening, and the microbes are located in an opening in the floater.

25. A hydrocarbon bioremediation system for removing hydrocarbons from a body of water, comprising:

(a) a floater formed of a porous polymeric foam and adapted to float in or on the surface of the body of water, and (b) microbes within the floater, adapted to digest the hydrocarbons, wherein the floater has an opening, and the microbes are located at least in the opening in the floater, and wherein the microbes are in the form of a tablet, powder or liquid.

* * * * *